(12) United States Patent
Kusuda et al.

(10) Patent No.: US 8,564,868 B2
(45) Date of Patent: Oct. 22, 2013

(54) LIGHT SCANNING APPARATUS

(75) Inventors: Shinya Kusuda, Nagoya (JP); Shogo Mori, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 399 days.

(21) Appl. No.: 13/051,016

(22) Filed: Mar. 18, 2011

(65) Prior Publication Data

US 2011/0235142 A1    Sep. 29, 2011

(30) Foreign Application Priority Data

Mar. 24, 2010    (JP) .................................. 2010-067428

(51) Int. Cl.
*G02B 26/08*    (2006.01)

(52) U.S. Cl.
USPC .................. 359/196.1; 359/212.1; 359/213.1; 359/216.1; 359/226.1

(58) Field of Classification Search
USPC .................... 359/196.1–226.2; 347/243–245, 347/257–261; 250/234–236
See application file for complete search history.

(56) References Cited

U.S. PATENT DOCUMENTS

| 2004/0184128 A1* | 9/2004 | Mikami | 359/216 |
| 2005/0231781 A1* | 10/2005 | Nomura et al. | 359/224 |
| 2007/0013989 A1* | 1/2007 | Lim | 359/223 |

FOREIGN PATENT DOCUMENTS

JP    05-134200    5/1993

* cited by examiner

*Primary Examiner* — James Phan
(74) *Attorney, Agent, or Firm* — Banner & Witcoff, Ltd.

(57) ABSTRACT

A light scanning apparatus includes: a light source configured to emit a light beam; a deflector configured to deflect and scan the light beam from the light source in a main scanning direction; a control substrate that is configured to control driving of the light source and includes a first connection part to which the light source is connected and a second connection part for connecting an external terminal; and a housing that supports the control substrate. The first connection part is arranged within the housing and the second connection part is exposed and arranged at the outside of the housing.

7 Claims, 9 Drawing Sheets

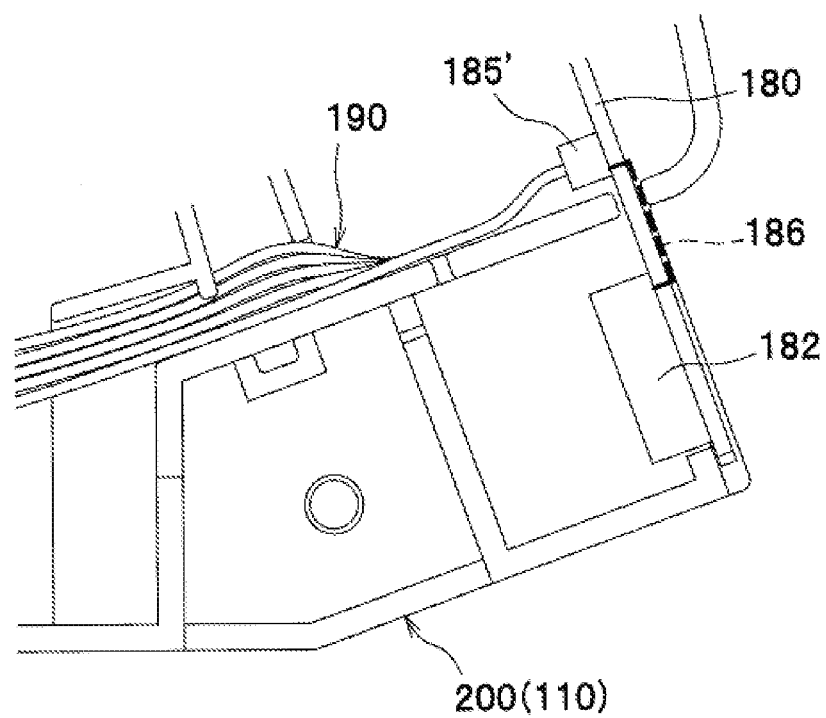

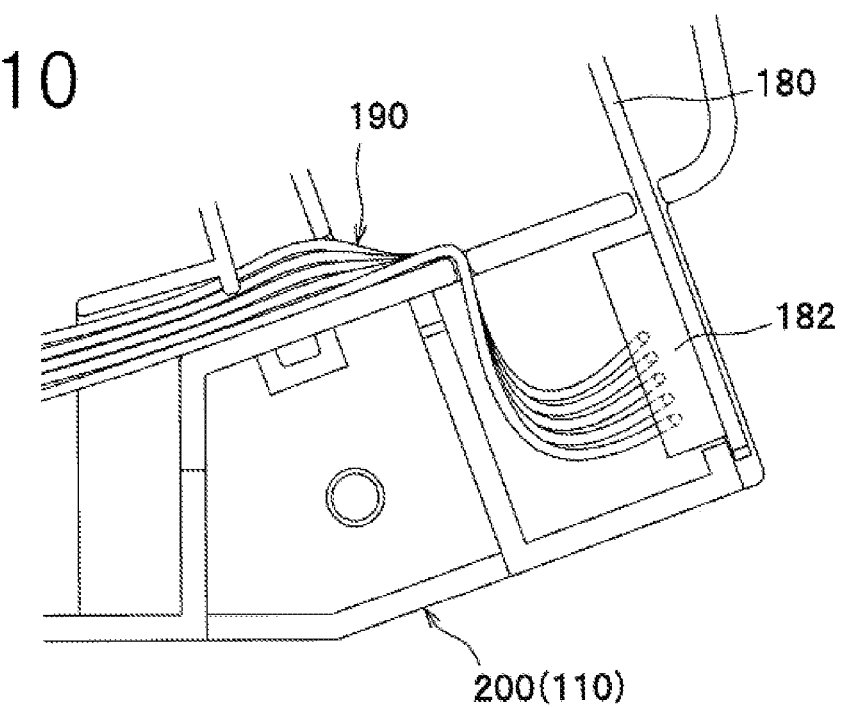

LIGHT SCANNING APPARATUS

BACKGROUND ART

The disclosure relates to a light scanning apparatus.

In image forming apparatuses such as laser printers, a light scanning apparatus is generally mounted which exposes a surface of a photosensitive member. A light scanning apparatus is known which has, in a housing (optical box), a light source (semiconductor laser), a deflector (polygonal rotating mirror) that deflects and scans laser light and a control substrate (laser driving circuit substrate) that controls driving of the light source.

SUMMARY

In the configuration in which the control substrate is arranged (received) in the housing of the light scanning apparatus, when assembling the light scanning apparatus to an image forming apparatus, it is difficult to connect a cable, which is provided to supply power, a signal and the like, to the substrate. In order to solve this problem, an opening for connecting the cable may be formed at a part of the housing. However, in this case, strength of the housing is lowered and the opening should be closed after connecting the cable. Accordingly, the operability during the assembling is deteriorated.

An aspect of the disclosure is to provide a light scanning apparatus capable of improving operability during the assembling. The aspect of the disclosure provides a light scanning apparatus comprising:

a light source configured to emit a light beam;

a deflector configured to deflect and scan the light beam from the light source in a main scanning direction;

a control substrate that is configured to control driving of the light source and includes a first connection part to which the light source is connected and a second connection part for connecting an external terminal; and a housing that supports the control substrate, wherein the first connection part is arranged within the housing and the second connection part is exposed and arranged at the outside of the housing.

BRIEF DESCRIPTION OF THE DRAWINGS

FIG. 9 is a perspective view showing an example of a configuration of connecting a cable to a connector.

FIG. 10 is a perspective view showing another example of a configuration of connecting a cable to a connector.

DESCRIPTION OF EXEMPLARY EMBODIMENTS

In the followings, exemplary embodiments will be specifically described with reference to the accompanying drawings. In the below descriptions, a schematic configuration of an image forming apparatus having a light scanning apparatus according to an exemplary embodiment will be first described and then detailed configurations of the light scanning apparatus will be described.

<Schematic Configuration of Laser Printer>

Figure 1:
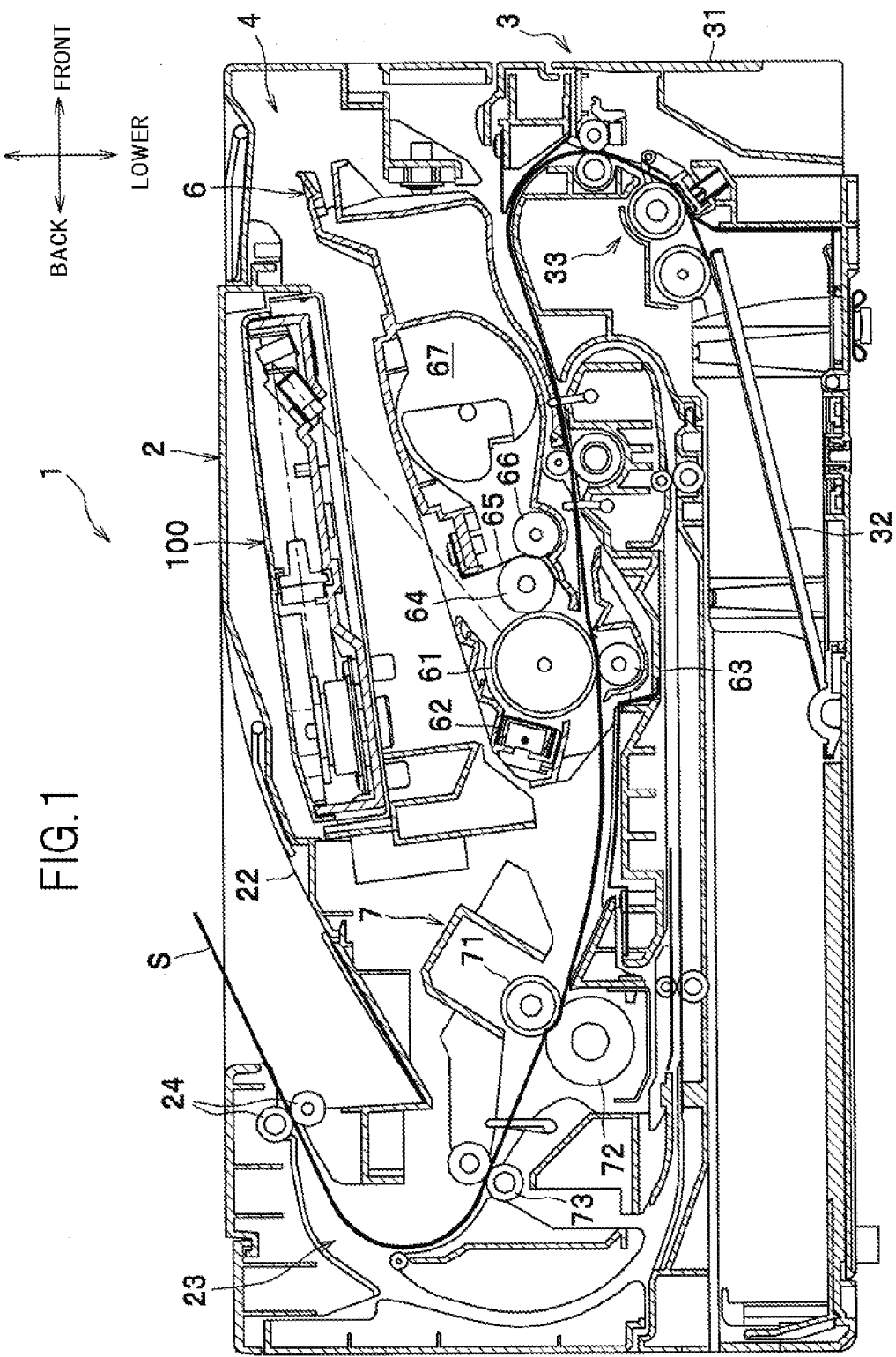
FIG. 1 shows a schematic configuration of a laser printer having a light scanning apparatus according to an exemplary embodiment.

As shown in FIG. 1, a laser printer 1 (image forming apparatus) has, in a body casing 2, a feeder unit 3 that feeds sheets S and an image forming unit 4 that forms an image on the sheet S.

Meanwhile, regarding the descriptions of the laser printer 1, the directions are set on the basis of a user who uses the laser printer 1. Specifically, in FIG. 1, the right side, the left side, the front side and the inner side are referred to as "front," "back," "left" and "right," respectively. In addition, the upper and lower directions in FIG. 1 are referred to as "upper-lower" direction.

The feeder unit 3 is provided at a lower part in the body casing 2 and has a sheet feeding tray 31, a sheet pressing plate 32 and a sheet feeding mechanism 33. The sheets S in the sheet feeding tray 31 are upwardly inclined by the sheet pressing plate 32 and supplied to the imaging forming unit 4 by the sheet feeding mechanism 4.

The image forming unit 4 has a light scanning apparatus 100, a developing unit 6 and a fixing unit 7.

The light scanning apparatus 100 is arranged at an upper part in the body casing 2 and emits laser light (dashed line) based on image data to expose a surface of a photosensitive drum 61, thereby forming an electrostatic latent image. The detailed configuration of the light scanning apparatus 100 will be described below.

The developing unit 6 is arranged below the light scanning apparatus 100 and is detachably mounted to the body casing 2 through an opening formed when opening a front cover (reference numeral thereof is omitted) mounted to the body casing 2. The developing unit 6 has a photosensitive drum 61, a charger 62, a transfer roller 63, a developing roller 64, a layer thickness regulating blade 65, a supply roller 66 and a toner accommodating unit 67 that accommodates toner (developer) therein.

In the developing unit 6, a surface of the photosensitive drum 61 is uniformly charged by the charger 62 and then exposed by the laser light from the light scanning apparatus 100, so that an electrostatic latent image based on image data is formed on the photosensitive drum 61. In addition, toner in the toner accommodating unit 67 is supplied to the developing roller 64 through the supply roller 66, is introduced between the developing roller 64 and the layer thickness regulating blade 65 and is then carried, as a thin layer having a predetermined thickness, on the developing roller 64.

The toner carried on the developing roller 64 is supplied from the developing roller 64 to the electrostatic latent image formed on the photosensitive drum 61. Thereby, the electrostatic latent image becomes a visible image, so that a toner image is formed on the photosensitive drum 61. Then, the sheet S is conveyed between the photosensitive drum 61 and the transfer roller 63, so that the toner image on the photosensitive drum 61 is transferred on the sheet S.

The fixing unit 7 is arranged at the rear of the developing unit 6 and has a heating roller 71 and a pressing roller 72 that is opposed to the heating roller 71 and presses the heating roller 71. In the fixing unit 7, the toner image transferred on the sheet S is heat-fixed while the sheet S passes through between the heating roller 71 and the pressing roller 72. The sheet S on which the toner image is heat-fixed is conveyed through a conveyance path 23 by conveyance rollers 73 and is then discharged on a sheet discharge tray 22 from the conveyance path 23 by discharge rollers 24.

<Detailed Configuration of Light Scanning Apparatus>

Next, the detailed configuration of the light scanning apparatus 100 will be described. In the below descriptions, a downstream side of a traveling direction of the laser light emitted from a light source device 120 will be simply referred to as "downstream."

Figure 2:
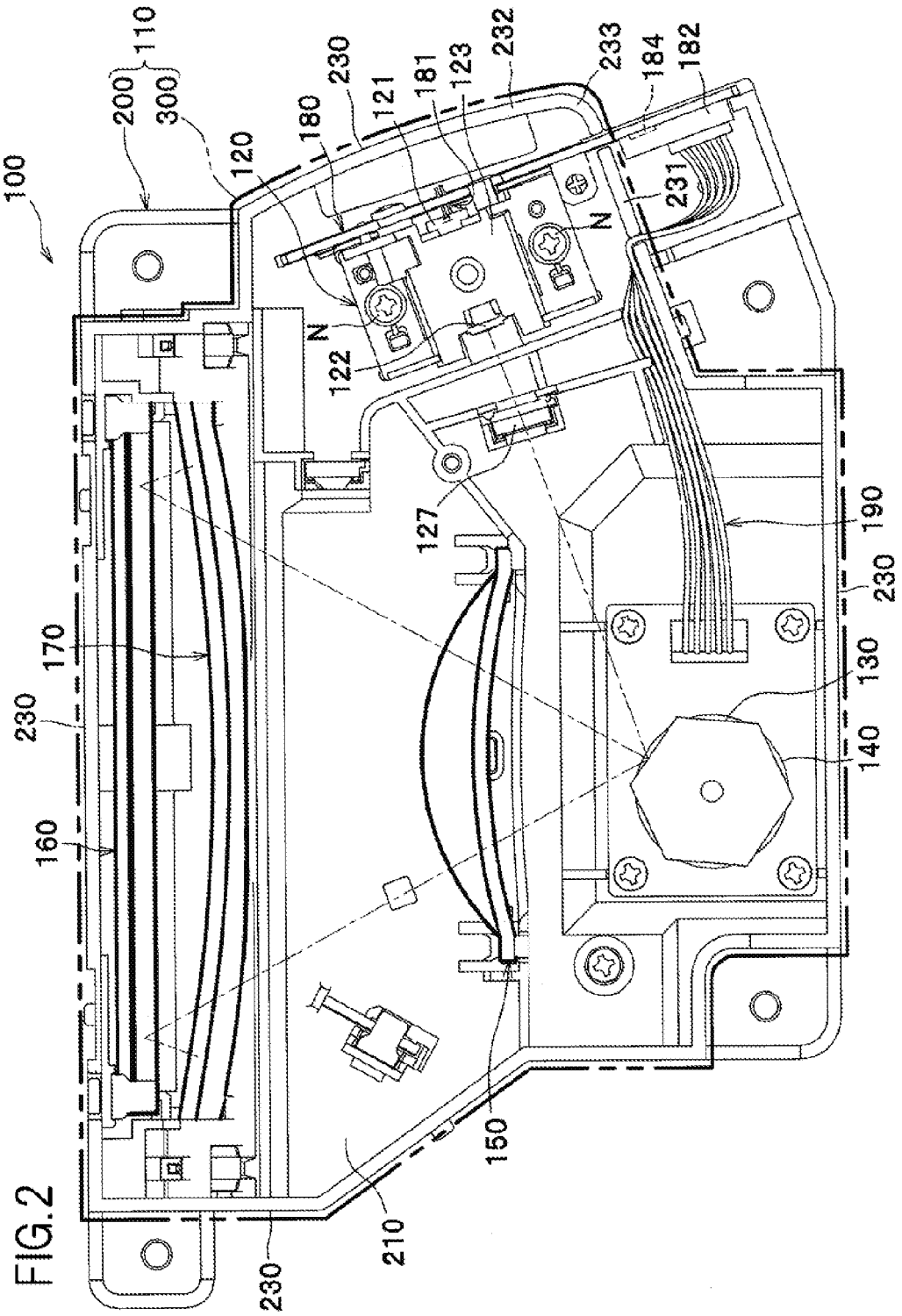
FIG. 2 is a plan view showing a configuration of the light scanning apparatus.
Figure 3:
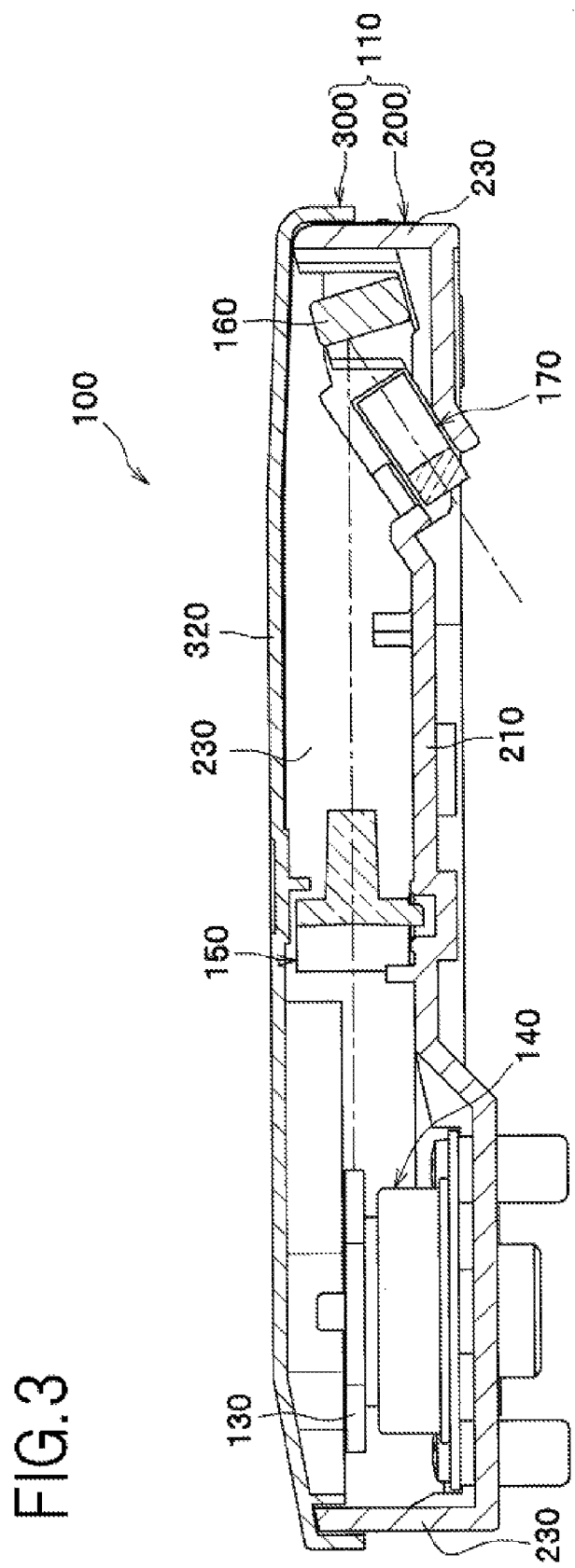
FIG. 3 is a sectional view showing a configuration of the light scanning apparatus.

As shown in FIGS. 2 and 3, the light scanning apparatus 100 has, in a housing 110, a light source device 120, a cylindrical lens 127, a polygon mirror 130 that is an example of a deflector, a polygon motor 140, an fθ lens 150, a reflector 160, a cylindrical lens 170 and a control substrate 180.

Figure 4:
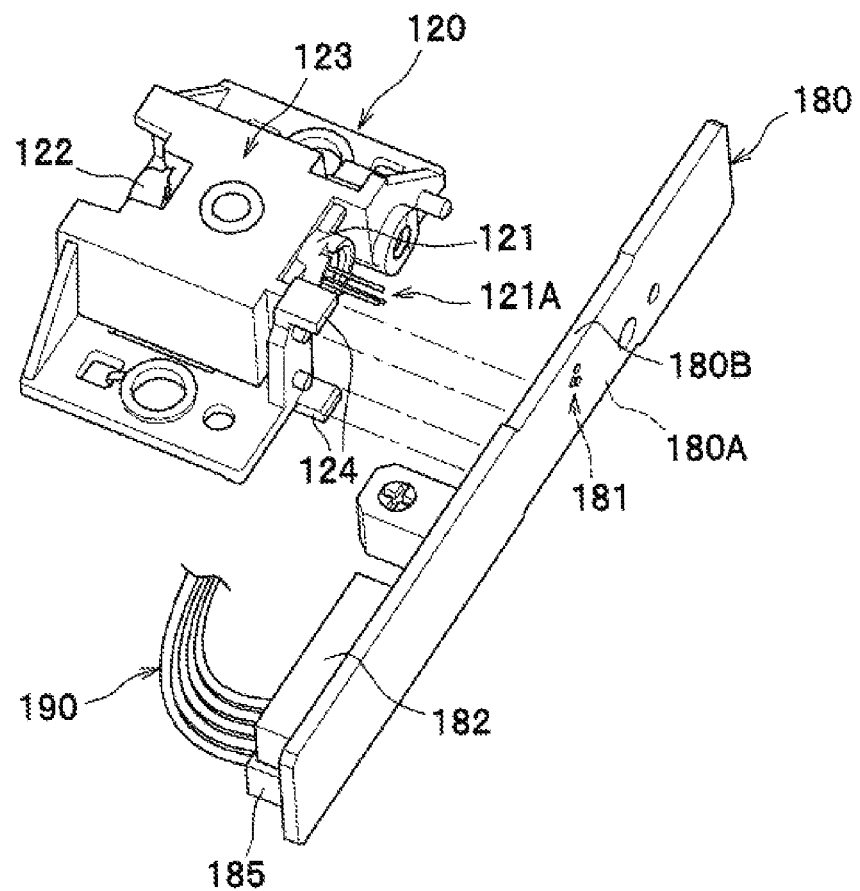
FIG. 4 is a perspective view of a light source device and a control substrate.

As shown in FIG. 4, the light source device 120 has a semiconductor laser light source 121 that is an example of a light source, a coupling lens 122 and a light source case 123 that is an example of a light source support member.

The semiconductor laser light source 121 is a well-known laser light source that emits laser light (laser beam) and has lead pins 121 that are connected to the control substrate 180 (light source connection part 181).

The coupling lens 122 is a lens that concentrates the laser light emitted from the semiconductor laser light source 121 and converts it into parallel luminous flux.

The light source case 123 is a member that supports the semiconductor laser light source 121 and the coupling lens 122, and is fixed to the housing 110 (bottom wall part 210 of the base frame 200) by a plurality of screws N (refer to FIG. 2). The light source case 123 has substrate holders 124 that hold a lower end portion 180A of the control substrate 180 (bottom wall part 210-side) and an upper end portion 180B (opposite side to the end portion 180A) therebetween.

Back to FIGS. 2 and 3, the cylindrical lens 127 is a scanning lens that is arranged downstream from the light source device 120 and through which the laser light emitted from the light source device 120 passes. The cylindrical lens 127 has a function of converting the laser light emitted from the light source device 120 so that the light forms an image on the polygon mirror 130 (reflective surface) only in a sub-scanning direction (direction perpendicular to a main scanning direction).

The polygon mirror 130 is arranged downstream from the cylindrical lens 127 and has six surfaces of a hexagon, which are reflective surfaces. The polygon mirror 130 reflects the laser light (the laser light having passed through the cylindrical lens 127) emitted from the light source device 120 while rotating at high speed and thus deflects and scans the laser light at a constant angular velocity in the main scanning direction (left-right direction in FIG. 2). The polygon motor 140 is a well-known motor for rotating the polygon mirror 130.

The fθ lens 150 is a scanning lens that is arranged downstream from the polygon mirror 130 and through which the laser light deflected and scanned by the polygon mirror 130 passes. The fθ lens 150 has functions of concentrating the laser light, which is scanned at the constant angular velocity by the polygon mirror 130, on the surface of the photosensitive drum 61 and converting the laser light so that it is scanned at a constant velocity.

The reflector 160 is arranged downstream from the fθ lens 150 and reflects the laser light, which has been deflected and scanned by the polygon mirror 130 and then has passed through the fθ lens 150, to thus return its light path, thereby directing the laser light toward the cylindrical lens 170.

The cylindrical lens 170 is a scanning lens that is arranged downstream from the reflector 160 and through which the laser light, which has been deflected and scanned by the polygon mirror 130, has passed through the fθ lens 150 and has been reflected by the reflector 160, passes. The cylindrical lens 170 has a function of refracting and thus converging the laser light in a sub-scanning direction, thereby correcting a face tangle error of the polygon mirror 130. In addition, the cylindrical lens 170 pairs with the cylindrical lens 127 and has a function of correcting the face tangle error of the laser light, which has been converted into the luminous flux.

In the light scanning apparatus 100, the laser light (refer to the dashed line), which is emitted from the light source device 120 based on the image data, is reflected or passes through in order of the cylindrical lens 127, the polygon mirror 130, the fθ lens 150, the reflector 160 and the cylindrical lens 170 and is then scanned on the surface (surface to be scanned) of photosensitive drum 61 (refer to FIG. 1) at high speed. Thereby, the surface of the photosensitive drum 61 is exposed, so that an electrostatic latent image based on the image data is formed on the photosensitive drum 61.

Figure 5:
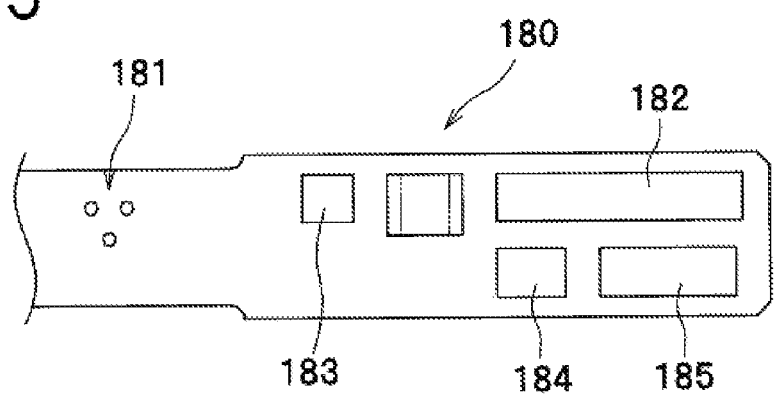
FIG. 5 shows the control substrate, when seen from a side having a connector mounted thereto.

The control substrate 180 is a substrate that controls driving of the semiconductor laser light source 121, the polygon mirror 130 and the like. As shown in FIG. 5, the control substrate 180 includes a light source connection part 181 that is an example of a first connection part, a connector 182 that is an example of a second connection part, a light source driving IC 183, a motor driving IC 184 that is an example of a deflector driving unit and a cable connector 185.

The light source connection part 181 is a part to which the lead pins 121A of the semiconductor laser light source 121 are connected (inserted). The lead pins 121A of the semiconductor laser light source 121, which are inserted into the light source connection part 181, are fixed to the control substrate 180 by soldering.

The connector 182 connects a cable terminal (external terminal) (not shown) of the laser printer 1 when assembling the light scanning apparatus 100 to the laser printer 1 (into the body casing 2).

The light source driving IC 183 is a circuit that controls driving (on and off) of the semiconductor laser light source 121.

The motor driving IC 184 is a circuit that controls driving of the polygon mirror 130, more specifically, rotation driving of the polygon mirror 130.

The cable connector 185 is a connector to which a cable 190 (refer to FIG. 2), which is electrically connected to the polygon mirror 130, more specifically, the polygon motor 140, is connected. In the light scanning apparatus 100, a control signal from the motor driving IC 184 is transmitted to the polygon mirror 130 (polygon motor 140) through the cable 190.

As shown in FIG. 2, the control substrate 180 is configured in such a way that the light source connection part 181 is arranged within the housing 110 and the connector 182 or motor driving IC 184 is exposed and arranged at the outside of the housing 110. Detailed configuration for arranging the control substrate 180 will be described below.

The housing 110 is a box-shaped member that supports the light source device 120, the polygon motor 140, the control substrate 180 and the like. More specifically, the housing 110 has a box-shaped (bowl-shaped) base frame 200 having an opened upper part (upper part in FIG. 3) and a cover frame 300 that is mounted to cover the opened part of the base frame 200, as shown in FIG. 3.

The base frame 200 includes a bottom wall part 210 that is an example of a first wall part and a sidewall part 230 that is an example of a third wall part (standing from the bottom wall part 210) extending to connect the bottom wall part 210 and an upper wall part 320 of the cover frame 300. The upper wall part 320 of the cover frame 300 is an example of a second wall part that is opposed to the bottom wall part 210 (first wall part).

Figure 6:
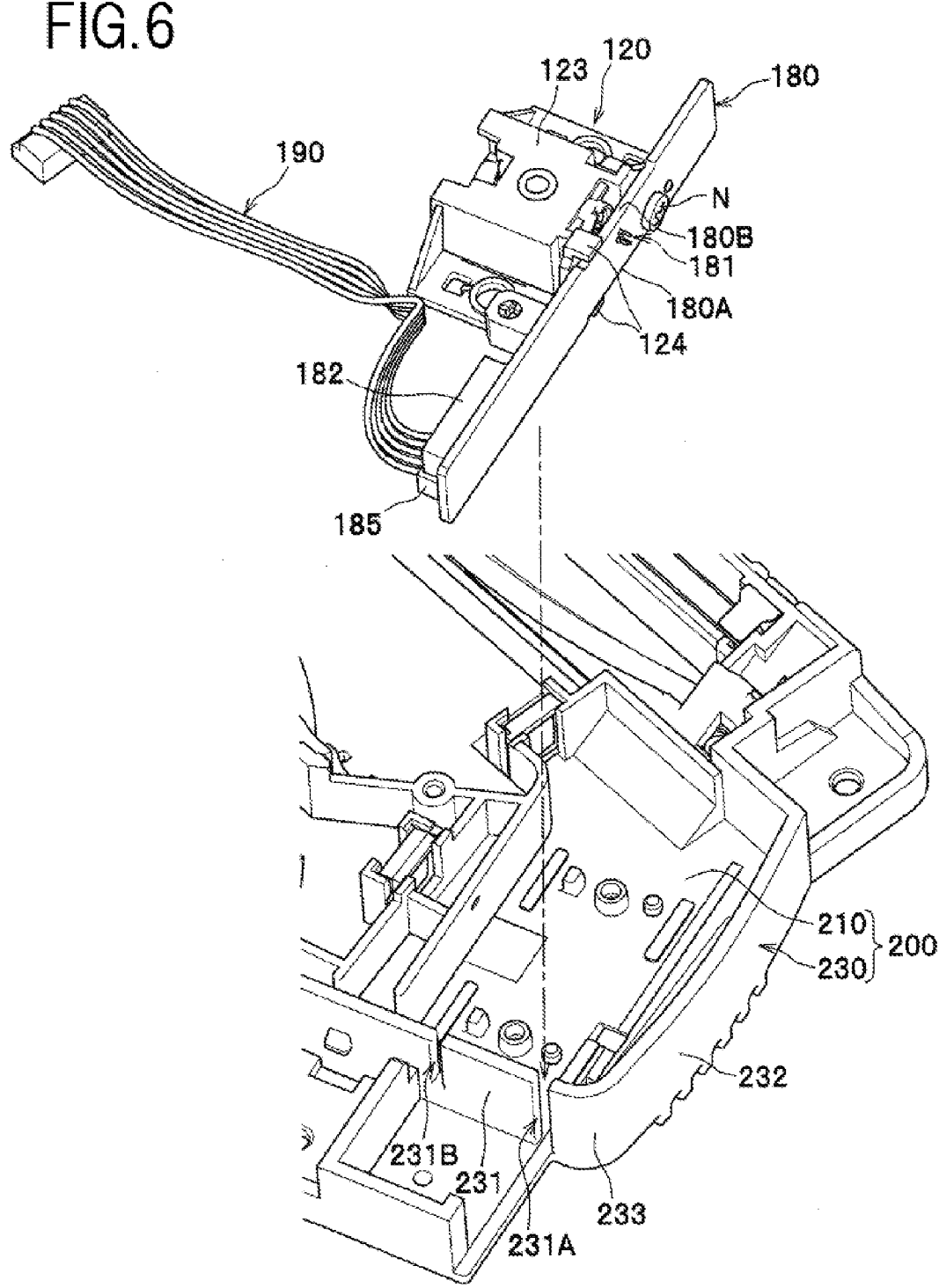
FIG. 6 is an exploded perspective view of the light source device, the control substrate and a base frame.

The control substrate 180 is arranged to be perpendicular to (to stand on) the bottom wall part 210. Specifically, as shown in FIG. 6, the control substrate 180 is fixed to the light source device 120 (light source case 123) by the screws N with the end portions 180A, 180B being held between the substrate holders 124. As the light source device 120 (light source case 123) is fixed to the bottom wall part 210 by the screws N, the control substrate 180 is orthogonally fixed (supported) to the bottom wall part 210, as shown in FIG. 7.

Figure 7:
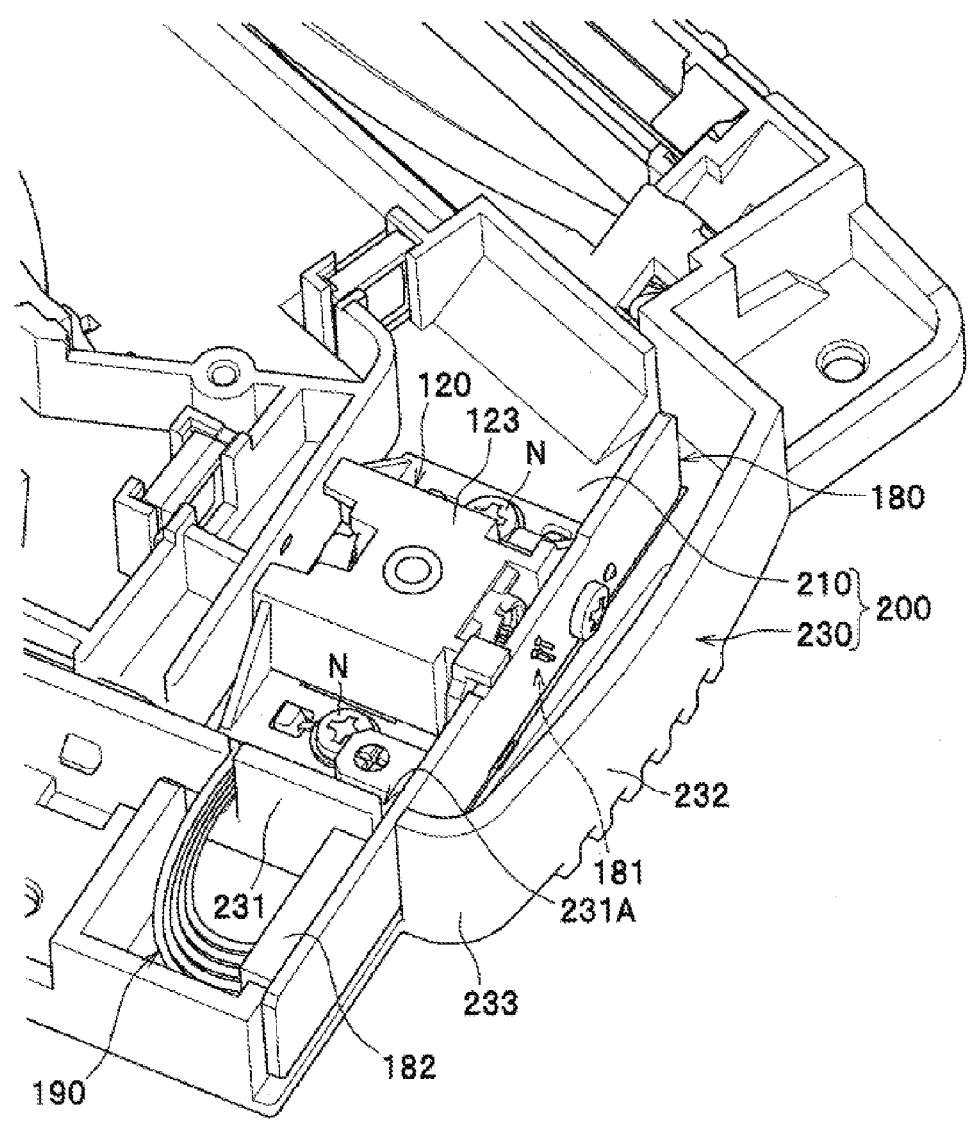
FIG. 7 is a perspective view of the light scanning apparatus, which is an enlarged view of the vicinity of the control substrate.

As shown in FIGS. 6 and 7, the sidewall part 230 has an intersecting wall part 231 that is an example of a fourth wall part and an adjacent wall part 232 that is an example of a fifth wall part.

The intersecting wall part 231 extends to be perpendicular to the control substrate 180 and has a slit-shaped opening 231A adjacent to a right end portion in FIG. 6, which communicates with the inside and outside of the housing 110 (base frame 200).

The adjacent wall part 232 continues from an end portion of the intersecting wall part 231 and extends adjacent to a part of the control substrate 110 arranged within the housing 100 while following the corresponding part. A part (continuous part 233) at which the adjacent wall part 232 and the intersecting wall part 231 are connected has a curved shape that is convex toward the outside of the housing 110.

The control substrate 180 is arranged in such a way that it passes through the opening 231A of the intersecting wall part 231. As the cover frame 300 is attached to the base frame 200, the light source connection part 181 is arranged within the housing 110 and the connector 182 and the motor driving IC 184 are exposed and arranged at the outside of the housing 110, as shown in FIG. 2.

Figure 8:
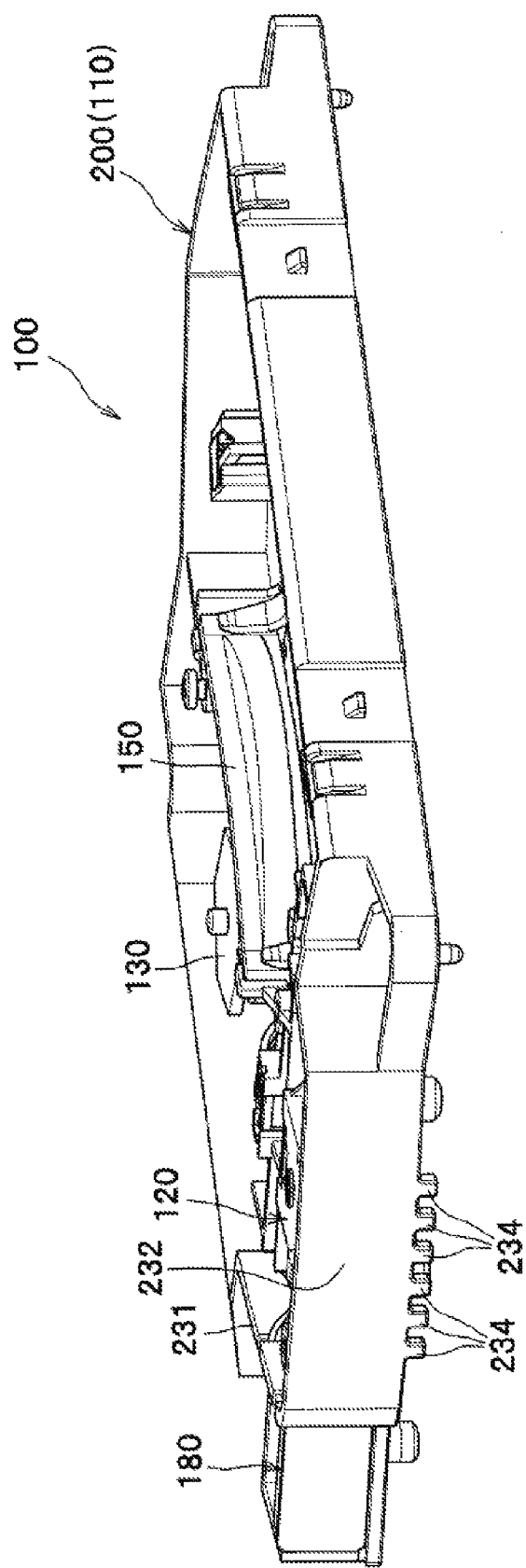
FIG. 8 is a perspective view of the light scanning apparatus.

In the meantime, as shown in FIG. 8, the base frame 200 (housing 110) of this exemplary embodiment is provided with a plurality of protrusions 234 at an end portion of the bottom wall part 210 of the adjacent wall part 232, which protrude downwardly. By appropriately changing the number or pattern of the protrusions, the protrusions 234 can be used for discriminating and managing the light scanning apparatus 100, the housing 110 and the like. Specifically, for example, it is possible to discriminate the specification of the light scanning apparatus 100 in accordance with differences of the number or pattern of the protrusions 234. In addition, when the base frame 200 is formed by an injection molding and the like, the protrusions can be used to discriminate a mold and the like.

According to this exemplary embodiment, following operational effects can be realized.

Since the light source connection part 181 to which the semiconductor laser light source 121 is connected is arranged within the housing 110 and the connector 182 for connecting the external terminal is exposed and arranged at the outside of the housing 110, it is possible to easily connect a cable (not shown) and the like of the laser printer 1 to the control substrate 180. Thereby, it is possible to improve the operability when assembling the light scanning apparatus 100 to the laser printer 1. In addition, since the light source connection part 181 is arranged within the housing 110, it is possible to prevent an operator who performs the assembling from contacting the light source connection part 181 (lead pins 121A of the semiconductor laser light source 121).

Since the sidewall part 230 has the opening 231A that communicates with the inside and outside of the housing and the control substrate 180 is arranged to pass through the opening 231A, it is possible to take out one end portion of the control substrate 180 to the outside of the housing 110. Thereby, when connecting an external terminal to the connector 182, the operator can connect the external terminal while holding (supporting) a part of the control substrate 180. Thus, it is possible to further improve the operability and to suppress the damage of the control substrate 180.

The part (continuous part 233) at which the intersecting wall part 231 having the opening 231A and the adjacent wall part 232 extending adjacent to the control substrate 180 are connected to each other has a curved shape that is convex toward the outside of the housing 110. Accordingly, it is possible to secure the strength of the base frame 200 (housing 110) even in the configuration in which the opening 231A through which the control substrate 180 passes is formed.

The motor driving IC 184 is exposed and arranged at the outside of the housing 110 (i.e., the motor driving IC is mounted at the part of the control substrate 180, which is exposed to the outside of the housing 110). Therefore, compared to a configuration in which the motor driving IC 184 is arranged within the housing 110, it is possible to relieve the heat that is generated as the motor is operated (i.e., it is possible to improve heat-radiation).

Since the light source case 123 has the substrate holders 124 that hold the end portions 180A, 180B of the control substrate 180, it is possible to reduce the number of screws N that are required to fix the control substrate 180 to the light source case 123. Thus, it is possible to improve the operability when assembling the light scanning apparatus 100. In addition, even when the control substrate 180 is rotated around the screws N due to vibration and the like caused when the polygon motor 140 is rotation-driven, it is possible to restrain the rotation by the substrate holders 124.

Although the exemplary embodiment has been described, the invention is not limited thereto. The specific configurations may be appropriately changed without departing from the scope of the invention.

In the above exemplary embodiment, the part (continuous part 233) at which the intersecting wall part 231 (fourth wall part) and the adjacent wall part 232 (fifth wall part) are connected to each other has a curved shape that is convex toward the outside of the housing 110. However, the invention is not limited thereto. For example, the intersecting wall part and the adjacent wall part may be connected to form a substantial right-angled shape. Alternatively, the intersecting wall part and the adjacent wall part may be intersected to form a substantial cross shape.

In the above exemplary embodiment, the motor driving IC 184 (deflector driving unit) is mounted at the part of the control substrate 180, which is exposed to the outside of the housing 110. However, the invention is not limited thereto. For example, the motor driving IC may be mounted at a part of the control substrate, which is arranged within the housing or at a substrate of the polygon motor.

Meanwhile, it is necessary to connect the cable 190 to the connector 182 (second connection part) so as to supply power to the polygon motor 140. For example, in the above exemplary embodiment, the cable 190 is taken out to the outside of the housing 110 from a notch 231B formed at the intersecting wall part 231 and is then connected to the control substrate 180 through the cable connector 185, as shown in FIGS. 6 and 7. In addition, the cable is connected to the connector 182 through a wire (not shown) on the control substrate 180.

The configuration of connecting the cable 190 to the connector 182 is not limited to the above exemplary embodiment. For example, as shown in FIG. 9, the cable 190 may be connected to a part (cable connector 185') that is arranged within the housing 110 of the control substrate 180 and to the connector 182 through a wire 186 on the control substrate 180. According to this configuration, it is possible to improve the strength of the housing 110 (base frame 200), compared to the configuration in which the notch 231B for taking out the cable 190 to the outside of the housing 110 is formed.

In addition, as shown in FIG. 10, the cable 190 may be directly connected to the connector 182.

In the above exemplary embodiment, the control substrate 180 is arranged to be perpendicular to the bottom wall part 210 (first wall part). However, the invention is not limited thereto. For example, the control substrate may be arranged to face the first wall part.

In the above exemplary embodiment, the light source connection part 181 into which the lead pins 121A (terminals) of the semiconductor laser light source 121 (light source) are inserted has been exemplified as the first connection part. However, the invention is not limited thereto. For example, a connector to which the terminals of the light source are connected may be adopted.

In the above exemplary embodiment, the semiconductor laser light source 121 has been exemplified as the light source. However, the invention is not limited thereto. For example, a solid laser light source such as YAG laser may be adopted.

In the above exemplary embodiment, the laser light (light beam), which has been converted into the parallel luminous flux, is emitted from the light source device 120. However, the invention is not limited thereto. For example, convergence light or divergence luminous flux may be emitted.

In the above exemplary embodiment, the polygon mirror 130, which deflects and scans the laser light (light beam) by rotation of the reflective surface, has been exemplified as the deflector. However, the invention is not limited thereto. For example, a vibration mirror that deflects and scans light beam by oscillation of the reflective surface may be adopted.

In the above exemplary embodiment, the laser printer 1 has been exemplified as the image forming apparatus. However, the invention is not limited thereto. For example, a copier or complex machine may be also possible. Further, in the above exemplary embodiment, the embodiment in which the light scanning apparatus of the invention is applied to the image forming apparatus (laser printer 1) has been described. However, the invention is not limited thereto. For example, the light scanning apparatus may be applied to a measurement apparatus or inspection apparatus.

What is claimed is:

1. A light scanning apparatus comprising:
a light source configured to emit a light beam;
a deflector configured to deflect and scan the light beam from the light source in a main scanning direction;
a control substrate that is configured to control driving of the light source and includes a first connection part to which the light source is connected and a second connection part for connecting an external terminal; and
a housing that supports the control substrate,
wherein the first connection part is arranged within the housing and the second connection part is exposed and arranged at the outside of the housing.

2. The light scanning apparatus according to claim 1, wherein
the housing includes a first wall part, a second wall part that is opposed to the first wall part and a third wall part that extends to connect the first wall part and the second wall part,
the third wall part has an opening that communicates inside and outside, and
the control substrate is arranged to pass through the opening.

3. The light scanning apparatus according to claim 2, wherein
the third wall part includes a fourth wall part that is provided with the opening and extends to be perpendicular to the control substrate and a fifth wall part that continues from an end portion of the fourth wall part and extends along a part of the control substrate arranged within the housing, and
a part at which the fourth wall part and the fifth wall part are connected to each other has a curved shape that is convex toward the outside of the housing.

4. The light scanning apparatus according to claim 2, further comprising a light source support member that supports the light source and is fixed to the first wall part of the housing,
wherein the control substrate is arranged to be perpendicular to the first wall part, and
wherein the light source support member includes a substrate holder that holds an end portion of the control substrate near the first wall part and an opposite end portion of the control substrate near the second wall part.

5. The light scanning apparatus according to claim 1, further comprising a cable that is electrically connected to the deflector and is connected to the second connection part.

6. The light scanning apparatus according to claim 5, wherein the cable is connected to a part of the control substrate arranged in the housing and is connected to the second connection part through a wire on the control substrate.

7. The light scanning apparatus according to claim 1 further comprising a deflector driving unit configured to control driving of the deflector,
wherein the deflector driving unit is mounted at a part of the control substrate exposed to the outside of the housing.

* * * * *